(12) United States Patent
Ohkuma et al.

(10) Patent No.: US 11,881,590 B2
(45) Date of Patent: Jan. 23, 2024

(54) ELECTRIC VEHICLE

(71) Applicant: HONDA MOTOR CO., LTD., Tokyo (JP)

(72) Inventors: Kanae Ohkuma, Wako (JP); Ryo Kitano, Wako (JP); Ryo Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 554 days.

(21) Appl. No.: 17/263,637

(22) PCT Filed: Jun. 10, 2019

(86) PCT No.: PCT/JP2019/022891
§ 371 (c)(1),
(2) Date: Jan. 27, 2021

(87) PCT Pub. No.: WO2020/044717
PCT Pub. Date: Mar. 5, 2020

(65) Prior Publication Data
US 2021/0194086 A1 Jun. 24, 2021

(30) Foreign Application Priority Data
Aug. 31, 2018 (JP) .................................. 2018-163119

(51) Int. Cl.
*H01M 50/209* (2021.01)
*H01M 50/202* (2021.01)
(Continued)

(52) U.S. Cl.
CPC ............. *H01M 50/209* (2021.01); *B60K 6/28* (2013.01); *B60L 50/64* (2019.02);
(Continued)

(58) Field of Classification Search
CPC ............. H01M 50/209; H01M 50/202; H01M 50/249; H01M 50/271; H01M 50/298;
(Continued)

(56) References Cited

U.S. PATENT DOCUMENTS 9,160,042 B2 * 10/2015 Fujii .................... H01M 10/625
9,166,258 B2 * 10/2015 Takizawa ................ B60L 58/26
(Continued)

FOREIGN PATENT DOCUMENTS

JP  2000-351328 A   12/2000
JP  2008-6904 A    1/2008
(Continued)

OTHER PUBLICATIONS

International Search Report dated Sep. 3, 2019, issued in counterpart application No. PCT/JP2019/022891, w/ English translation (4 pages).
(Continued)

*Primary Examiner* — Abdullah A Riyami
*Assistant Examiner* — Nader J Alhawamdeh
(74) *Attorney, Agent, or Firm* — WHDA, LLP (57) ABSTRACT

Battery cases are formed such that a small second battery case is disposed on an upper front part of a large first battery case, the second battery case is disposed below a front part of a seat cushion of a rear seat, a recess portion extending in a fore-and-aft direction and having at least part of an exhaust passage member passing therethrough is formed in a lower face of a middle part in a vehicle width direction of the first battery case, battery modules housed in the first battery case are disposed on left and right sides of the recess portion, and a battery module housed in the second battery case is disposed so that a longitudinal direction thereof follows the (Continued)

vehicle width direction. Therefore, it is possible to ensure the headroom for a rear seat by disposing the rear seat at as low a position as possible.

9 Claims, 8 Drawing Sheets

(51) Int. Cl.
    *H01M 50/298*     (2021.01)
    *H01M 50/271*     (2021.01)
    *B60K 6/28*     (2007.10)
    *H01M 50/249*     (2021.01)
    *B60L 50/64*     (2019.01)

(52) U.S. Cl.
    CPC ....... *H01M 50/202* (2021.01); *H01M 50/249* (2021.01); *H01M 50/271* (2021.01); *H01M 50/298* (2021.01); *H01M 2220/20* (2013.01)

(58) Field of Classification Search
    CPC ......... H01M 2220/20; H01M 10/6568; H01M 10/6556; B60K 6/28; B60K 13/04; B60K 2001/005; B60K 2001/0433; B60K 2001/0438; B60K 1/04; B60L 50/64; Y02T 10/70; Y02E 60/10
    See application file for complete search history.

(56) References Cited

U.S. PATENT DOCUMENTS

| | | | | |
|---|---|---|---|---|
| 10,252,636 | B2* | 4/2019 | Wada | H01M 50/317 |
| 11,059,522 | B2* | 7/2021 | Iwasa | B60L 50/72 |
| 2008/0000703 | A1* | 1/2008 | Shindou | H01M 50/244 |
| | | | | 180/68.5 |
| 2013/0078496 | A1 | 3/2013 | Lim et al. | |
| 2014/0338998 | A1* | 11/2014 | Fujii | B60K 1/04 |
| | | | | 180/68.5 |
| 2016/0355100 | A1* | 12/2016 | Ito | H01M 10/6568 |
| 2020/0075907 | A1* | 3/2020 | Shimazaki | H01M 50/249 |
| 2020/0076019 | A1* | 3/2020 | Ohkuma | H01M 50/204 |
| 2021/0194086 | A1* | 6/2021 | Ohkuma | B60K 13/04 |

FOREIGN PATENT DOCUMENTS

| | | |
|---|---|---|
| JP | 2013-71729 A | 4/2013 |
| JP | 2016-52862 A | 4/2016 |
| JP | 2017-4919 A | 1/2017 |
| JP | 6086604 B2 | 3/2017 |

OTHER PUBLICATIONS

International Preliminary Report on Patentability (Form PCT/IPEA/409) of International Application No. PCT/JP2019/022891 dated Sep. 14, 2020. (17 pages).

Written Opinion dated Sep. 3, 2019, issued in counterpart application No. PCT/JP2019/022891 (6 pages).

Reply to Written Opinion of PCT/JP2019/022891 dated Sep. 3, 2019, w/English translation (16 pages).

* cited by examiner

ELECTRIC VEHICLE

TECHNICAL FIELD

The present invention relates to an electric vehicle that includes an electric motor, an engine, a battery case disposed on a lower face of a floor panel and housing battery modules for driving the electric motor, a muffler extending rearward from the engine, and a front seat and a rear seat disposed on an upper face of the floor panel.

BACKGROUND ART

An arrangement in which a battery pack disposed beneath a rear seat of an electric vehicle includes a plurality of battery modules, front battery modules are stacked vertically as two layers, a rear battery module is disposed as one layer so as to follow the inclination of a seat cushion of the rear seat, and the headroom for an occupant is ensured by disposing the rear seat at as low a position as possible is known from Patent Document 1 below.

RELATED ART DOCUMENTS

Patent Documents

Patent Document 1: Japanese Patent No. 6086604

SUMMARY OF THE INVENTION

Problems to be Solved by the Invention

When an electric vehicle equipped with both an electric motor and an engine includes an exhaust passage member (an exhaust pipe or a muffler), disposed in the fore-and-aft direction, in a middle part in the vehicle width direction of a lower face of a vehicle body, if an attempt is made to avoid interference with the exhaust passage member, the positions of a battery pack and a rear seat become high, and there is the problem that it becomes difficult to ensure the headroom for the rear seat.

The present invention has been accomplished in light of the above circumstances, and it is an object thereof to ensure the headroom for a rear seat by disposing the rear seat at as low a position as possible when disposing a battery pack and the rear seat above an exhaust passage member.

Means for Solving the Problems

In order to attain the above object, according to a first aspect of the present invention, there is provided an electric vehicle comprising an electric motor, an engine, a battery case disposed on a lower face of a floor panel and housing battery modules for driving the electric motor, an exhaust passage member extending rearward from the engine, and a front seat and a rear seat disposed on an upper face of the floor panel, wherein the battery case comprises a first battery case and a second battery case that are formed independently so as to each house a separate battery module, the second battery case has a smaller size than a size of the first battery case and is disposed on an upper front part of the first battery case, the second battery case is disposed below a front part of a seat cushion of the rear seat, a cooling medium jacket cooling the second battery case from an outside of the second battery case is formed between a case upper wall of the first battery case and a case lower wall of the second battery case, a recess portion extending in a fore-and-aft direction and having at least part of the exhaust passage member passing therethrough is formed in a lower face of a middle part in a vehicle width direction of the first battery case, the battery modules housed in the first battery case are disposed on left and right sides of the recess portion, and the battery module housed in the second battery case is disposed so that a longitudinal direction thereof follows the vehicle width direction.

Further, according to a second aspect of the present invention, in addition to the first aspect, at least one of a battery control device and a junction board is disposed in a space above the recess portion in a rear part of the first battery case, and a cell voltage sensor is disposed in a space above the battery module in the rear part of the first battery case.

Furthermore, according to a third aspect of the present invention, in addition to the second aspect, a height of a middle part in the vehicle width direction of a rear upper face of the first battery case is smaller than a height of an upper face of the second battery case.

Further, according to a fourth aspect of the present invention, in addition to any one of the first to third aspects, the cooling medium jacket is defined by a lower face of the case upper wall of the first battery case and an upper face of the case lower wall of the second battery case.

Furthermore, according to a fifth aspect of the present invention, in addition to any one of the first to fourth aspects, a case rear wall of the second battery case is inclined from upper front toward lower rear, and wiring is disposed in a space defined between a front face of the case rear wall and a rear face of the battery module disposed in a front part of the second battery case.

Moreover, according to a sixth aspect of the present invention, in addition to any one of the first to fifth aspects, at least one of an upper part of the first battery case and a rear part of the second battery case comprises a beam portion extending in the vehicle width direction.

Further, according to a seventh aspect of the present invention, in addition to any one of the first to sixth aspects, the first battery case comprises a connector providing electrical connection between the battery modules and electrical equipment of the electric vehicle, the connector comprises a main body portion and an interface portion, and the interface portion is disposed on a front wall or a rear wall of the first battery case above the recess portion when viewed in the vehicle body fore-and-aft direction.

Furthermore, according to an eighth aspect of the present invention, in addition to the seventh aspect, the main body portion is disposed above the recess portion when viewed from above.

Moreover, according to a ninth aspect of the present invention, in addition to the eighth aspect, the interface portion is disposed on the front wall of the first battery case, the main body portion is disposed in front of a junction board disposed above the recess portion, and the junction board and the main body portion are electrically connected to each other.

A muffler 19 of an embodiment corresponds to the exhaust passage member of the present invention, a first battery case 31 and a second battery case 32 of the embodiment correspond to the battery case of the present invention, a second water jacket 47 of the embodiment corresponds to the cooling medium jacket of the present invention, and a low voltage connector 50 and a high voltage connector 51 of the embodiment correspond to the connector of the present invention.

Effects of the Invention

In accordance with the first aspect of the present invention, the electric vehicle includes the electric motor, the engine, the battery case disposed on the lower face of the floor panel and housing the battery modules for driving the electric motor, the exhaust passage member extending rearward from the engine, and the front seat and rear seat disposed on the upper face of the floor panel. Since the battery case includes the first battery case and the second battery case that are formed independently so as to each house the separate battery module, the second battery case has a smaller size than that of the first battery case and is disposed on an upper front part of the first battery case, the second battery case is disposed below a front part of the seat cushion of the rear seat, the recess portion extending in the fore-and-aft direction and having at least part of the exhaust passage member passing therethrough is formed in a lower face of a middle part in the vehicle width direction of the first battery case, the battery modules housed in the first battery case are disposed on left and right sides of the recess portion, and the battery module housed in the second battery case is disposed so that its longitudinal direction follows the vehicle width direction, it is possible to dispose the rear seat at as low a position as possible while avoiding any interference with the battery case and while ensuring a sufficient volume for the battery case, thereby enabling the headroom for an occupant to be ensured. Further, since the cooling medium jacket cooling the second battery case from an outside of the second battery case is formed between the case upper wall of the first battery case and the case lower wall of the second battery case, it is possible to cool the case lower wall of the second battery case thus enhancing the effect of cooling the battery module.

Furthermore, in accordance with the second aspect of the present invention, since at least one of the battery control device and the junction board is disposed in a space above the recess portion in the rear part of the first battery case, and the cell voltage sensor is disposed in a space above the battery module in the rear part of the first battery case, it is possible to suppress the height of the upper face of the first battery case by positioning the battery control device or the junction board, which have relatively large vertical dimensions, in the space above the recess portion, where the battery module is not present, and by positioning the cell voltage sensor, which has relatively small vertical dimensions, in the space above the battery module.

Moreover, in accordance with the third aspect of the present invention, since the height of the middle part in the vehicle width direction of the rear upper face of the first battery case is smaller than the height of the upper face of the second battery case, it is possible to make it difficult for the first battery case to interfere with the rear seat.

Moreover, in accordance with the fourth aspect of the present invention, since the cooling medium jacket is defined by the lower face of the case upper wall of the first battery case and the upper face of the case lower wall of the second battery case, it is possible to form the cooling medium jacket while minimizing any increase in the number of components, and it is also possible to minimize the height of the cooling medium jacket.

Furthermore, in accordance with the fifth aspect of the present invention, since the case rear wall of the second battery case is inclined from the upper front toward the lower rear, and the wiring is disposed in a space defined between the front face of the case rear wall and the rear face of the battery module disposed in a front part of the second battery case, it is possible to ensure a space in the interior of the second battery case while avoiding any interference between the case rear wall and the rear seat, thereby enabling the wiring to be disposed by utilizing the space.

Moreover, in accordance with the sixth aspect of the present invention, since at least one of the upper part of the first battery case and the rear part of the second battery case includes the beam portion extending in the vehicle width direction, it is possible to enhance the side collision resistance by reinforcing the battery case by means of the beam part.

Furthermore, in accordance with the seventh aspect of the present invention, since the first battery case includes the connector providing electrical connection between the battery modules and electrical equipment of the electric vehicle, the connector includes the main body portion and the interface portion, and the interface portion is disposed on the front wall or the rear wall of the first battery case above the recess portion when viewed in the vehicle body fore-and-aft direction, it is possible to efficiently carry out the routing of wiring for electrical equipment disposed in front of or to the rear of the first battery case.

Moreover, in accordance with the eighth aspect of the present invention, since the main body portion is disposed above the recess portion when viewed from above, it is possible to rationally dispose the main body portion by utilizing effectively a dead space above the recess portion where no battery module is disposed.

Furthermore, in accordance with the ninth aspect of the present invention, since the interface portion is disposed on the front wall of the first battery case, the main body portion is disposed in front of the junction board disposed above the recess portion, and the junction board and the main body portion are electrically connected, it is possible to minimize the length of the bus bar providing a connection between the junction board and the main body portion.

EXPLANATION OF REFERENCE NUMERALS AND SYMBOLS

11 Electric motor
12 Engine
14 Floor panel
15 Front seat
16 Rear seat
16a Seat cushion
19 Muffler (exhaust passage member)
31 First battery case (battery case)

32 Second battery case (battery case)
33a Recess portion
33h Front wall
34a Case upper wall
34f Beam portion
37 Battery module
39 Junction board
40 Battery control device
41 Cell voltage sensor
42a Case lower wall
43c Case rear wall
43d Beam portion
45 Battery module
47 Second water jacket (cooling medium jacket)
49 Wiring
50 Low voltage connector (connector)
50a Main body portion
50b Interface portion
51 High voltage connector (connector)
51a Interface portion

BEST MODE FOR CARRYING OUT THE INVENTION

A first embodiment of the present invention is explained below by reference to FIG. 1 to FIG. 7. In the present description, the fore-and-aft direction, the left-and-right direction (vehicle width direction), and the up-and-down direction are defined with reference to an occupant seated on a driver's seat.

First Embodiment

Figure 1:
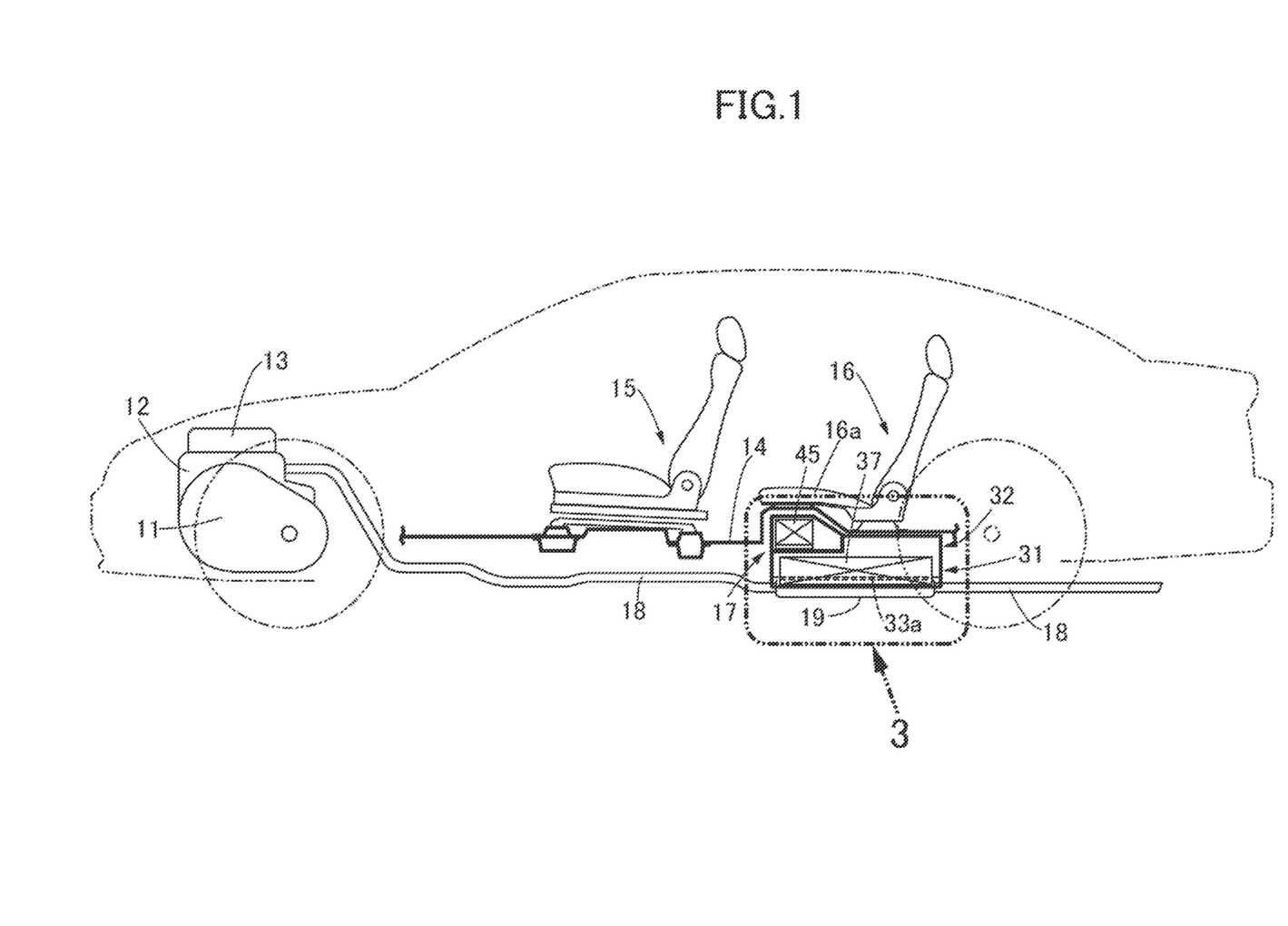
FIG. 1 is a side view of a vehicle body of a plug-in hybrid vehicle. (first embodiment)

As shown in FIG. 1, mounted on a vehicle body front part of a front wheel drive plug-in hybrid vehicle are an electric motor 11 for driving a front wheel, an engine 12 for driving a generator charging a battery, and a power drive unit 13 equipped with an inverter controlling the drive of the electric motor 11. A front seat 15 and a rear seat 16 are disposed on an upper face of a floor panel 14, and a battery pack 17 supplying power to the electric motor 11 is mounted on a lower face of the floor panel 14 beneath the rear seat 16. An exhaust pipe 18 extends rearward from the engine 12, and a muffler 19 provided in an intermediate part of the exhaust pipe 18 is disposed beneath the battery pack 17.

Figure 2:
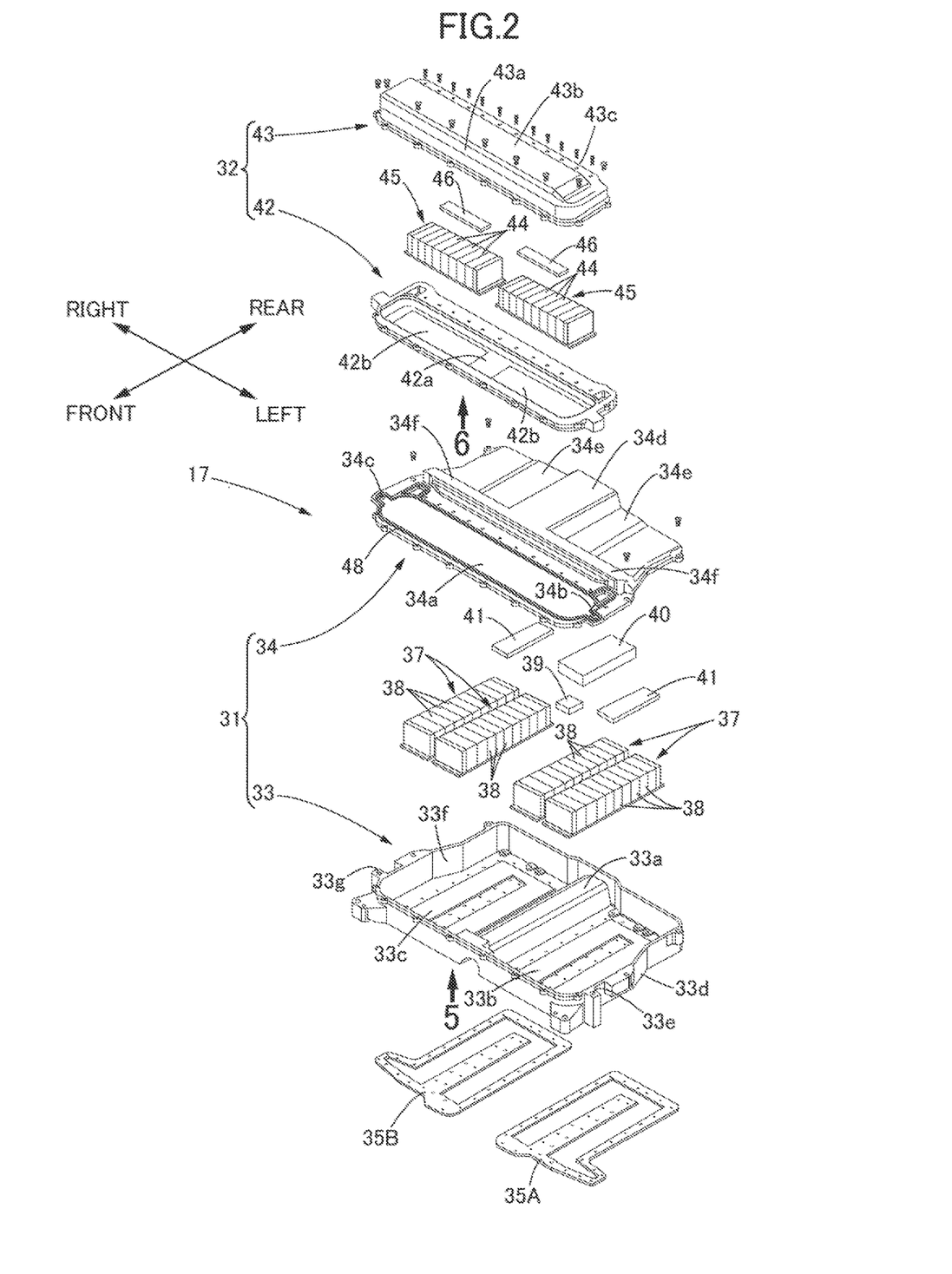
FIG. 2 is an exploded perspective view of a battery pack. (first embodiment)

As shown in FIG. 2, the battery pack 17 includes a lower-level first battery case 31 and an upper-level second battery case 32 superimposed on an upper front part of the first battery case 31. The first battery case 31 includes a first case main body 33 and a first cover 34 both made of a metal by die-casting, and is formed by joining the first cover 34 to an upper face opening of the first case main body 33. Formed in a middle part in the vehicle width direction of the first case main body 33 is a groove-shaped recess portion 33a having a semicircular cross section and extending in the fore-and-aft direction so as to be recessed upward, and housed within the recess portion 33a is part of the muffler 19 (see FIG. 1).

As shown in FIG. 3 to FIG. 5 and FIG. 7, the first case main body 33 includes a left case bottom wall 33b and a right case bottom wall 33c that are divided to the left and right by means of the recess portion 33a, a left first water jacket 36A is formed between the left case bottom wall 33b and a left lid member 35A by joining the left lid member 35A to a lower face of the left case bottom wall 33b, and a right first water jacket 36B is formed between the right case bottom wall 33c and a right lid member 35B by joining the right lid member 35B to a lower face of the right case bottom wall 33c.

A cooling water supply port 36a is formed at the front end and the inner end (right end) in the vehicle width direction of the left first water jacket 36A, cooling water being supplied to the cooling water supply port 36a from a cooling water tank, which is not illustrated, and a cooling water supply passage 33e is formed in a left case side wall 33d of the first case main body 33 so as to face upward, cooling water discharged from the left end of the left first water jacket 36A being supplied to the second battery case 32 via the cooling water supply passage 33e. A cooling water discharge port 36b is formed in the front end and the inner end (left end) in the vehicle width direction of the right first water jacket 36B, cooling water being discharged from the cooling water discharge port 36b to a cooling water tank, which is not illustrated, and a cooling water discharge passage 33g is formed in a right case side wall 33f of the first case main body 33 so as to face downward, cooling water discharged from the second battery case 32 being supplied to the right end of the right first water jacket 36B via the cooling water discharge passage 33g.

Returning to FIG. 2, two battery modules 37 are mounted on an upper face of each of the left case bottom wall 33b and the right case bottom wall 33c of the first case main body 33. The battery module 37, which is a rectangular parallelepiped, is formed by layering a plurality of battery cells 38 in the longitudinal direction, and is disposed in the fore-and-aft direction so that its longitudinal direction (layering direction) follows the left and right sides of the recess portion 33a of the first case main body 33.

A junction board 39 and a battery control device 40 are disposed on a rear upper face of the recess portion 33a of the first case main body 33, and a cell voltage sensor 41 is disposed on an upper face of each of the battery modules 37 on the left and right sides of the junction board 39 and the battery control device 40.

Formed in the first cover 34 covering the upper face opening of the first case main body 33 is a case upper wall 34a forming a bottom wall of a second water jacket 47, which is described later, so as to extend in the vehicle width direction, and formed in opposite end parts in the vehicle width direction of the case upper wall 34a are left and right communication holes 34b, 34c communicating with the cooling water supply passage 33e and the cooling water discharge passage 33g on the left and right sides of the first case main body 33. A raised portion 34d covering the top of the junction board 39 and the battery control device 40 is formed in a middle part in the vehicle width direction of a rear part of the first cover 34, and a raised portion 34e covering the top of each of the left and right cell voltage sensors 41 is formed on opposite sides of the raised portion 34d. Furthermore, a beam portion 34f having a trapezoidal cross section and protruding upward is formed in the vehicle width direction in a middle part in the fore-and-aft direction of the first cover 34.

The second battery case 32 includes a second case main body 42 and a second cover 43 both made of a metal by die-casting, two battery modules 45 on the left and right having battery cells 44 layered in the vehicle width direction are disposed in the interior thereof, and a cell voltage sensor 46 is disposed on an upper face of each battery module 45. A case lower wall 42a of the second case main body 42 of the second battery case 32 includes a recess portion 42b that is recessed upward, and a second water jacket 47 (see FIG. 3, FIG. 4, FIG. 6 and FIG. 7) is defined between a lower face of the recess portion 42b and an upper face of the case upper wall 34a of the first cover 34 of the first battery case 31.

Figure 3:
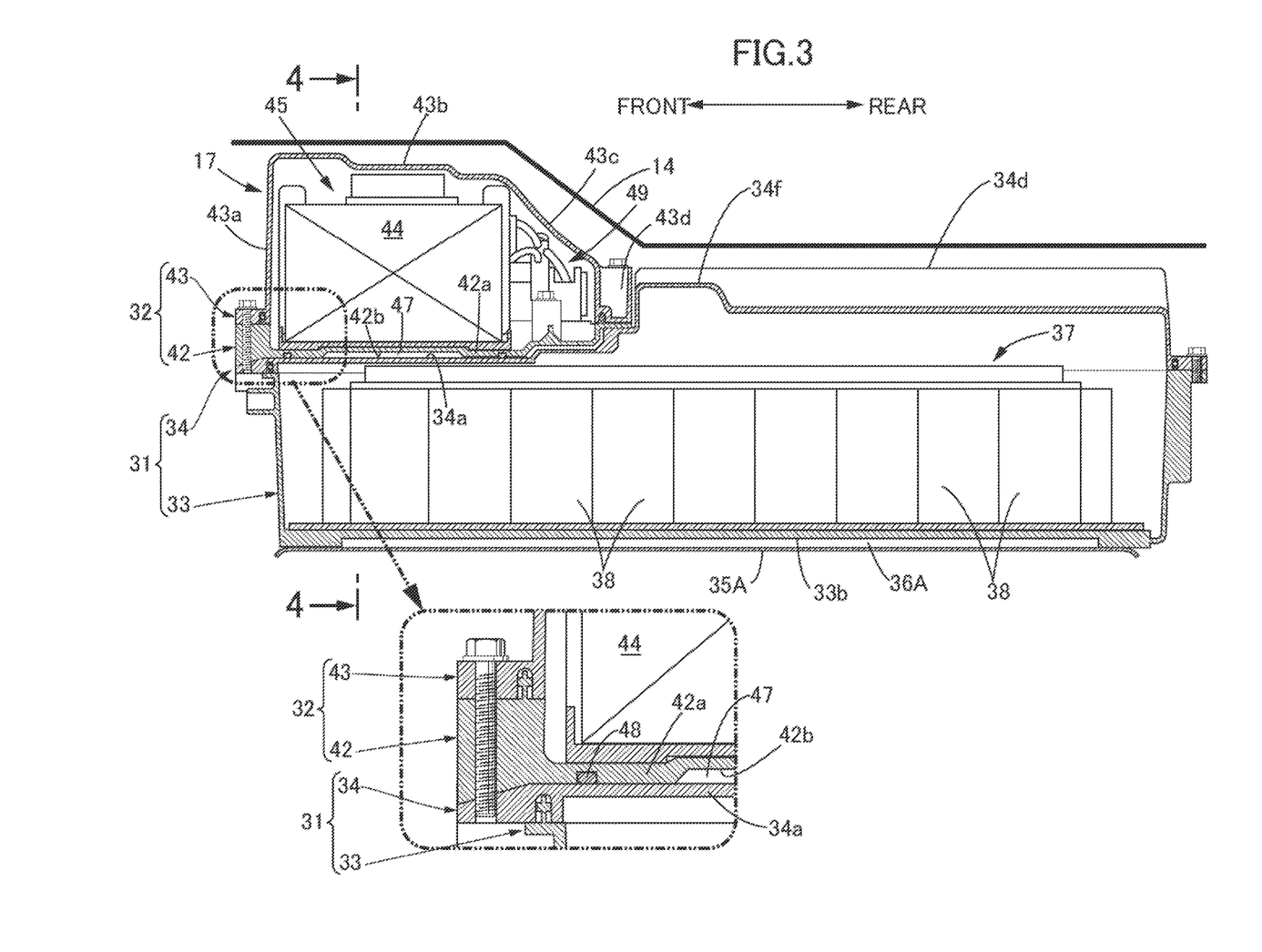
FIG. 3 is an enlarged view of part 3 in FIG. 1. (first embodiment)
Figure 4:
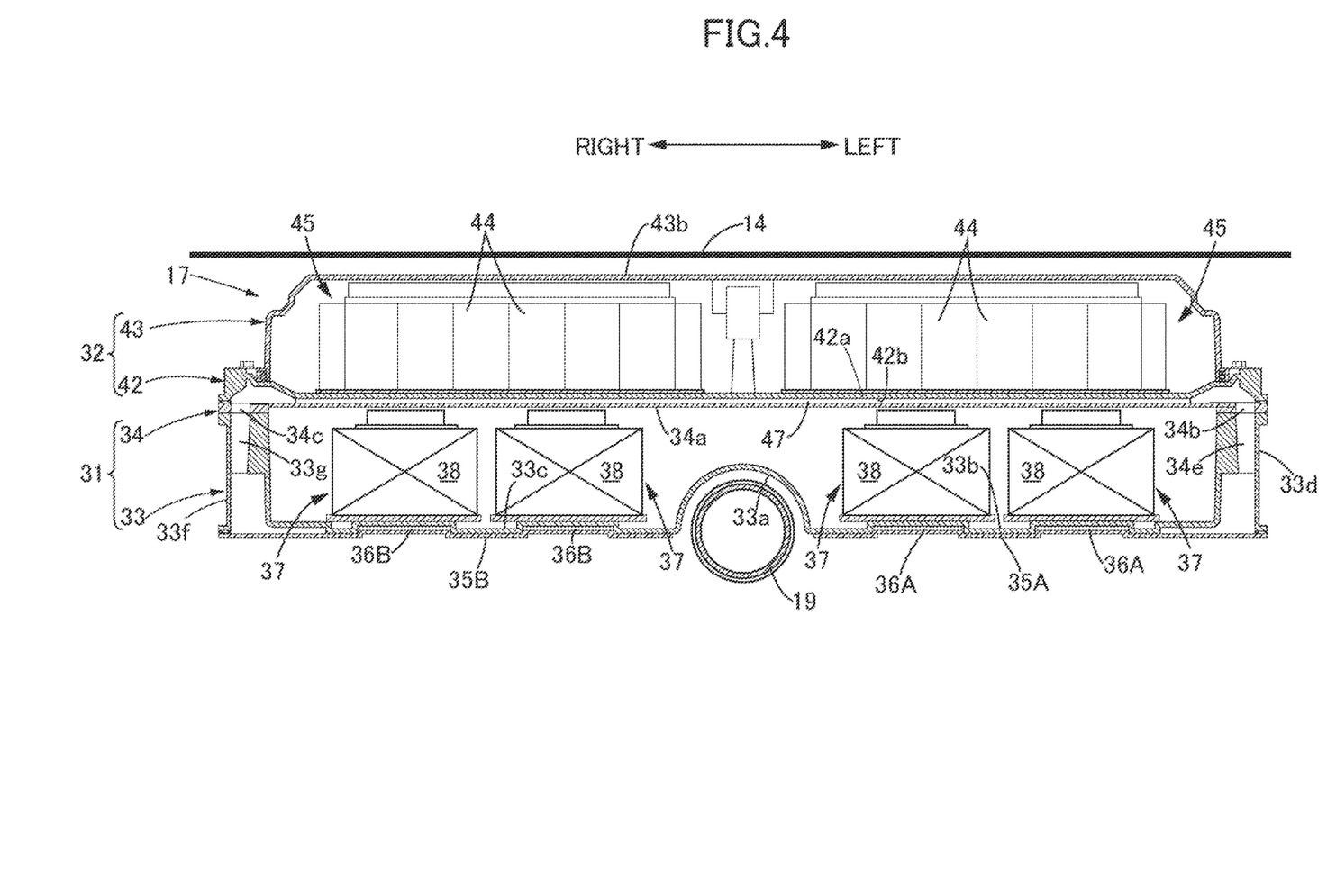
FIG. 4 is a sectional view along line 4-4 in FIG. 3. (first embodiment)
Figure 5:
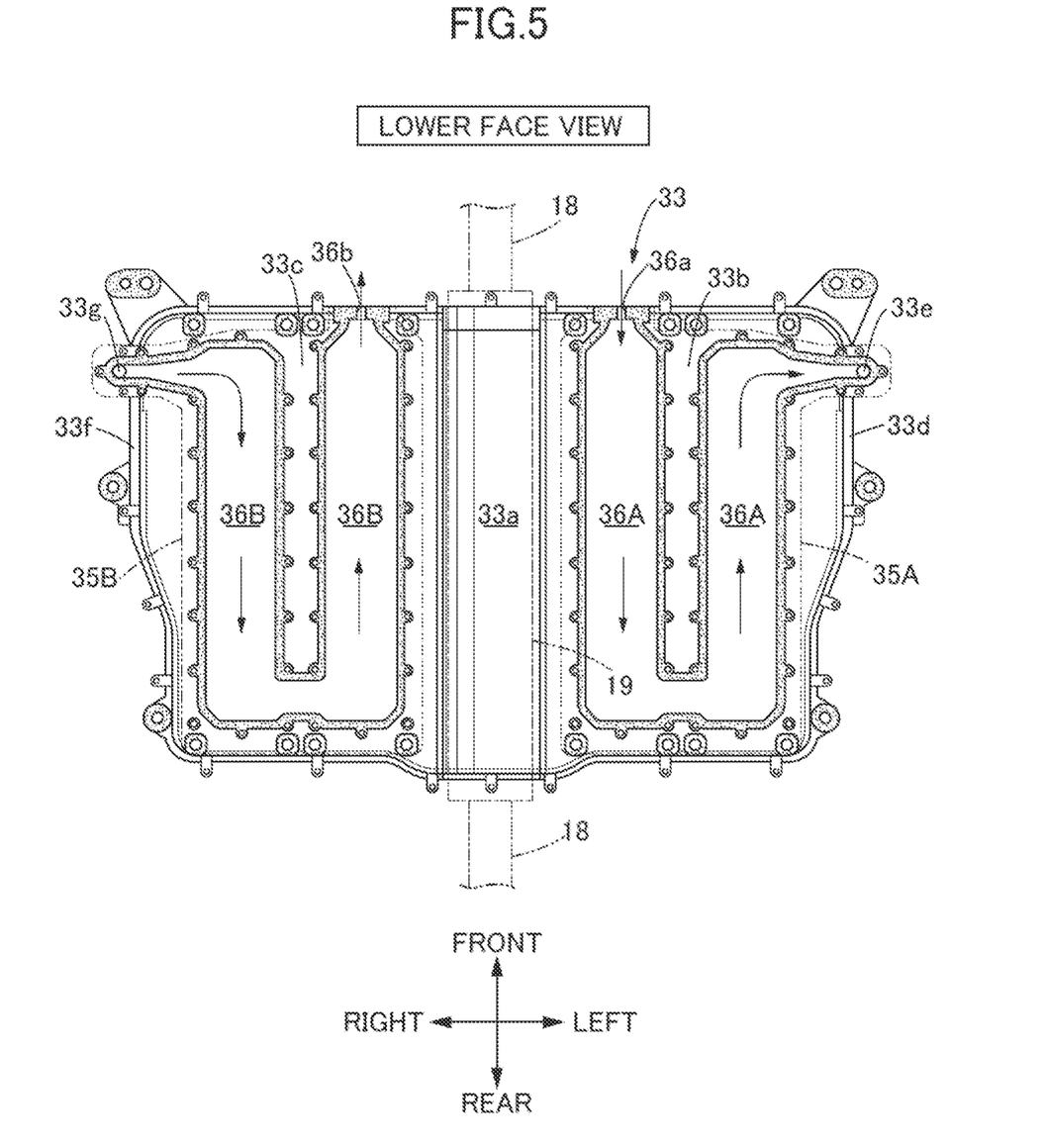
FIG. 5 is a view in the direction of arrow 5 in FIG. 2. (first embodiment)
Figure 6:
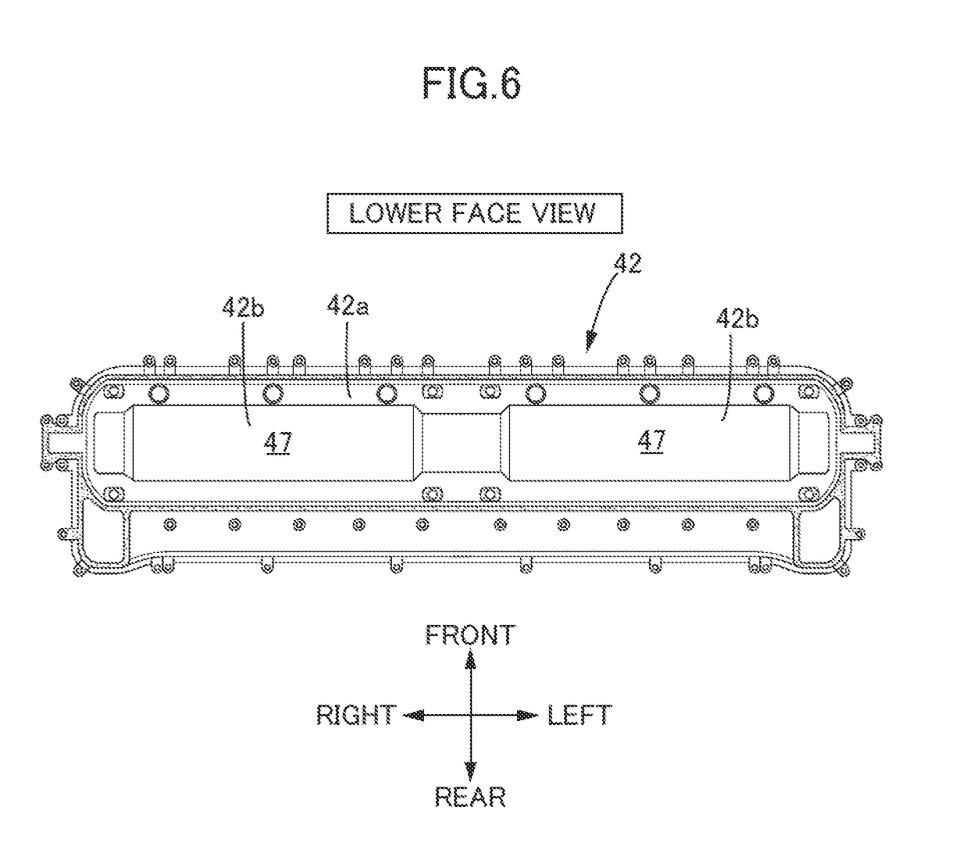
FIG. 6 is a view in the direction of arrow 6 in FIG. 2. (first embodiment)
Figure 7:
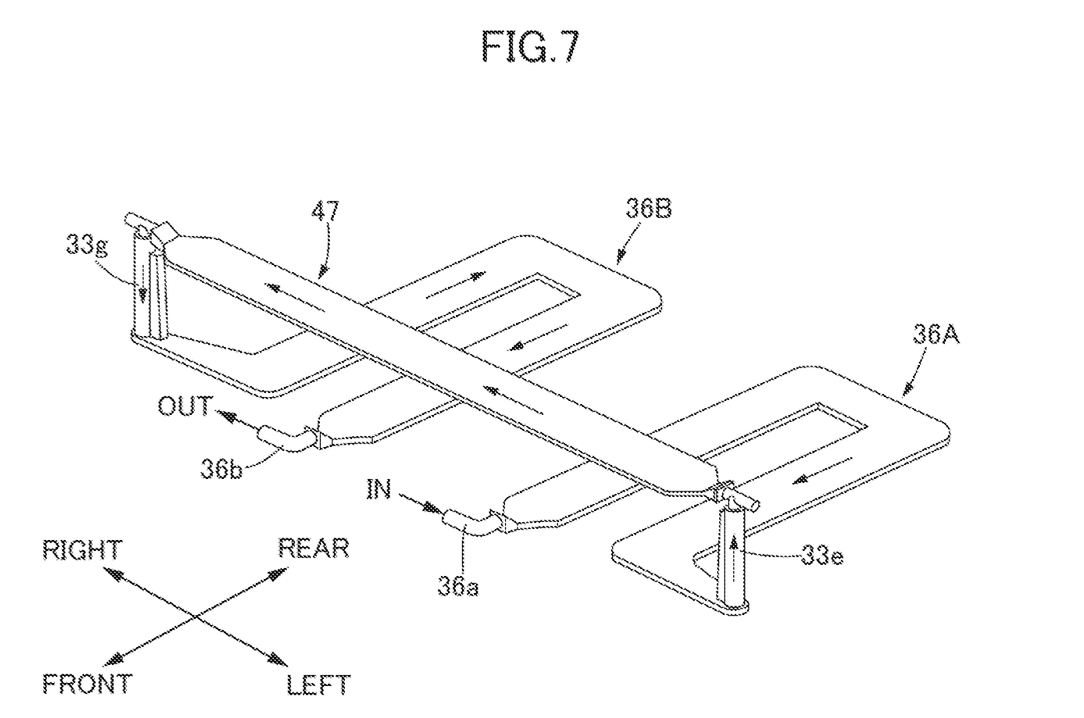
FIG. 7 is a view showing the placement of a first water jacket and a second water jacket. (first embodiment)

As shown in FIG. 2 and inside an enlarged frame of FIG. 3, the outer peripheries of the second water jacket 47 and left and right communication holes 34b, 34c are sealed by means of a seal member 48 held between a lower face of the case lower wall 42a of the second case main body 42 and the upper face of the case upper wall 34a of the first cover 34. The upper face of the case upper wall 34a of the first cover 34 is inclined downward in going outward on the outer side of the seal member 48.

As shown in FIG. 3, a cross section in the fore-and-aft direction of the second cover 43 includes a case front wall 43a, a case upper wall 43b and a case rear wall 43c, the case rear wall 43c being inclined from upper front toward lower rear. A space having a triangular cross section is formed between the case rear wall 43c and a rear face of the battery module 45 housed in the second battery case 32, and wiring 49 is housed in this space. A beam portion 43d having a U-shaped cross section opening upward is formed in the vehicle width direction along the rear end of the case rear wall 43c of the second cover 43.

As shown in FIG. 1, the battery pack 17 arranged as described above is mounted on the lower face of the floor panel 14 beneath the rear seat 16. A seat cushion 16a of the rear seat 16 is formed so as to rise forward, a front part of the seat cushion 16a is disposed above the second battery case 32 of the battery pack 17, and a rear part of the seat cushion 16a is disposed above a rear part of the first battery case 31 of the battery pack 17.

The operation of the embodiment of the present invention having the above arrangement is now explained.

Since the muffler 19 provided in the exhaust pipe 18 extending rearward from the engine 12 mounted in the vehicle body front part is housed in the recess portion 33a extending in the fore-and-aft direction between the left case bottom wall 33b and the right case bottom wall 33c of the first case main body 33 of the lower-level first battery case 31, it is possible to dispose the battery pack 17 at as low a position as possible while avoiding any interference with the muffler 19, and it is thereby possible to ensure the headroom for an occupant by disposing the rear seat 16, which is disposed above battery pack 17, at a low position.

Since the four battery modules 37 housed in the first battery case 31 are disposed so that their longitudinal direction is oriented in the fore-and-aft direction so as to follow the left and right sides of the recess portion 33a, which bulges upward from a middle part in the vehicle width direction of the first case main body 33, it is possible to suppress the height of the first cover 34 of the first battery case 31 by lowering the position at which the battery module 37 is mounted. On the other hand, since the two battery modules 45 of the second battery case 32 are disposed in the second case main body 42 so that their longitudinal direction is oriented in the vehicle width direction, it is possible to reduce the width in the fore-and-aft direction of the second battery case 32 and superimpose it only on a front part of the first battery case 31. As a result, the upper face of the battery pack 17 becomes a stepped shape that rises in going forward, and it is possible, by disposing the seat cushion 16a of the rear seat 16 so as to follow the forward and upward inclination, to ensure the headroom for an occupant by disposing the rear seat 16 at an even lower position.

In particular, since the junction board 39 and the battery control device 40 of the battery pack 17 are disposed by utilizing a space above the recess portion 33a in the rear part of the first battery case 31, and the cell voltage sensor 41 is disposed by utilizing a space above the battery module 37 in the rear part of the first battery case 31, it is possible to suppress the height of the upper face of the first battery case 31 by positioning the junction board 39 and the battery control device 40, which have relatively large vertical dimensions, in the space above the recess portion 33a, where the battery module 37 is not present, and by positioning the cell voltage sensor 41, which has relatively small vertical dimensions, in the space above the battery module 37.

Due to the junction board 39, the battery control device 40 and the cell voltage sensor 41 being housed in this way, even if the height of the rear upper face of the first battery case 31 is somewhat high, since the height of the rear upper face of the first battery case 31 is lower than the height of the upper face of the second battery case 32, there is no possibility that the first battery case 31 will interfere with the seat cushion 16a of the rear seat 16.

Furthermore, since the case rear wall 43c of the second cover 43 of the second battery case 32 is inclined from the upper front toward the lower rear, and the wiring 49 is disposed in a space defined between the front face of the case rear wall 43c and the rear face of the battery module 45 disposed in a front part of the second battery case 32, it is possible to ensure a space in the interior of the second battery case 32 while avoiding any interference between the case rear wall 43c and the seat cushion 16a of the rear seat 16, thereby enabling the wiring 49 to be disposed by utilizing the space.

Moreover, since the first cover 34 of the first battery case 31 includes the beam portion 34f extending in the vehicle width direction, and the second cover 43 of the second battery case 32 includes the beam portion 43d extending in the vehicle width direction, it is possible to enhance the side collision resistance by reinforcing the first battery case 31 and the second battery case 32 with the beam portions 34f, 43d.

Low temperature cooling water is made to circulate via the path: cooling water supply port 36a→left first water jacket 36A→cooling water supply passage 33e→second water jacket 47→cooling water discharge passage 33g→right first water jacket 36B→cooling water discharge port 36b, thus cooling the four battery modules 37 by means of the left first water jacket 36A and the right first water jacket 36B formed in the bottom part of the first battery case 31 and cooling the two battery modules 45 by means of the second water jacket 47 formed in the bottom part of the second battery case 32.

Since the bottom wall of the first case main body 33 of the first battery case 31 is divided into the left case bottom wall 33b and the right case bottom wall 33c by means of the recess portion 33a housing the muffler 19, the water jacket of the first case main body 33 is divided into two, that is, the left first water jacket 36A and the right first water jacket 36B, and the second water jacket 47, which is separate from the left first water jacket 36A and the right first water jacket 36B, is provided on a lower face of the second case main body 42 of the second battery case 32.

The battery pack 17 thus includes the three water jackets, that is, the left first water jacket 36A, the right first water jacket 36B and the second water jacket 47, which are separated in the vertical and lateral directions, and since they are connected in series by means of the cooling water supply passage 33e provided in the left case side wall 33d of the first case main body 33 and the cooling water discharge passage 33g provided in the right case side wall 33f, it is possible to obtain high cooling performance while minimizing the number of components by reducing the length of the cooling water passage.

Furthermore, since both the cooling water supply port 36*a* of the left first water jacket 36A and the cooling water discharge port 36*b* of the right first water jacket 36B are provided on the front face side of the first battery case 31, it is possible to minimize the length of the cooling water passage providing a connection between the battery pack 17 and the cooling water tank, which is disposed in front of the battery pack 17. Moreover, since the cooling water supply port 36*a* and the cooling water supply passage 33*e* are provided at opposite ends in the vehicle width direction of the left first water jacket 36A, the cooling water discharge port 36*b* and the cooling water discharge passage 33*g* are provided at opposite ends in the vehicle width direction of the right first water jacket 36B, and the cooling water supply passage 33*e* and the cooling water discharge passage 33*g* are provided at opposite ends in the vehicle width direction of the second water jacket 47, it is possible to enhance the cooling performance by making cooling water flow evenly in the internal spaces of the left first water jacket 36A, the right first water jacket 36B and the second water jacket 47 while simplifying the routing of the cooling water passage.

In particular, since the upwardly recessed recess portion 42*b* is formed in the case lower wall 42*a* of the second case main body 42 of the second battery case 32, the battery module 45 is placed on the upper face of the recess portion 42*b*, and the second water jacket 47 is formed between the lower face of the recess portion 42*b* and the upper face of the case upper wall 34*a* of the first cover 34 of the first battery case 31 joined thereto, it is possible to arrange the second water jacket 47 by utilizing the case upper wall 34*a* of the first battery case 31 and the case lower wall 42*a* of the second battery case 32, which already exist, as they are without adding a special member. Moreover, since the second water jacket 47 is defined outside the first battery case 31 and the second battery case 32, even if cooling water leaks from the second water jacket 47, there is no possibility that the cooling water will enter the interior of the first battery case 31 or the second battery case 32.

Furthermore, since the cooling water supply passage 33*e* providing a connection between the left first water jacket 36A and the second water jacket 47 is formed in the left case side wall 33*d* of the first battery case 31, and the cooling water discharge passage 33*g* providing a connection between the right first water jacket 36B and the second water jacket 47 is formed in the right case side wall 33*f* of the first battery case 31, not only is it possible to cut the number of components due to it being unnecessary to employ a special member such as an external pipe, but it is also possible to further reduce the number of components by encircling the second water jacket 47, the communication hole 34*b*, and the communication hole 34*b* in common by means of the seal member 48. Moreover, since the case upper wall 34*a* of the first cover 34 of the first battery case 31 is inclined downward in going outward on the outer side of the seal member 48 defining the outer periphery of the second water jacket 47 (see FIG. 3), even if cooling water leaks from the seal member 48, it is possible to prevent cooling water that has leaked from building up on the upper face of the case upper wall 34*a* of the first cover 34.

Furthermore, since the battery module 45 housed in the second battery case 32 has the battery cells 44 layered in the vehicle width direction, it is possible to make the second battery case 32 long in the vehicle width direction, thus avoiding interference with the seat cushion 16*a* of the rear seat 16. In this arrangement, since the second water jacket 47 of the second battery case 32 is disposed so that cooling water flows in the vehicle width direction, it is possible to efficiently cool all of the battery cells 44 of the battery module 45.

Figure 8:
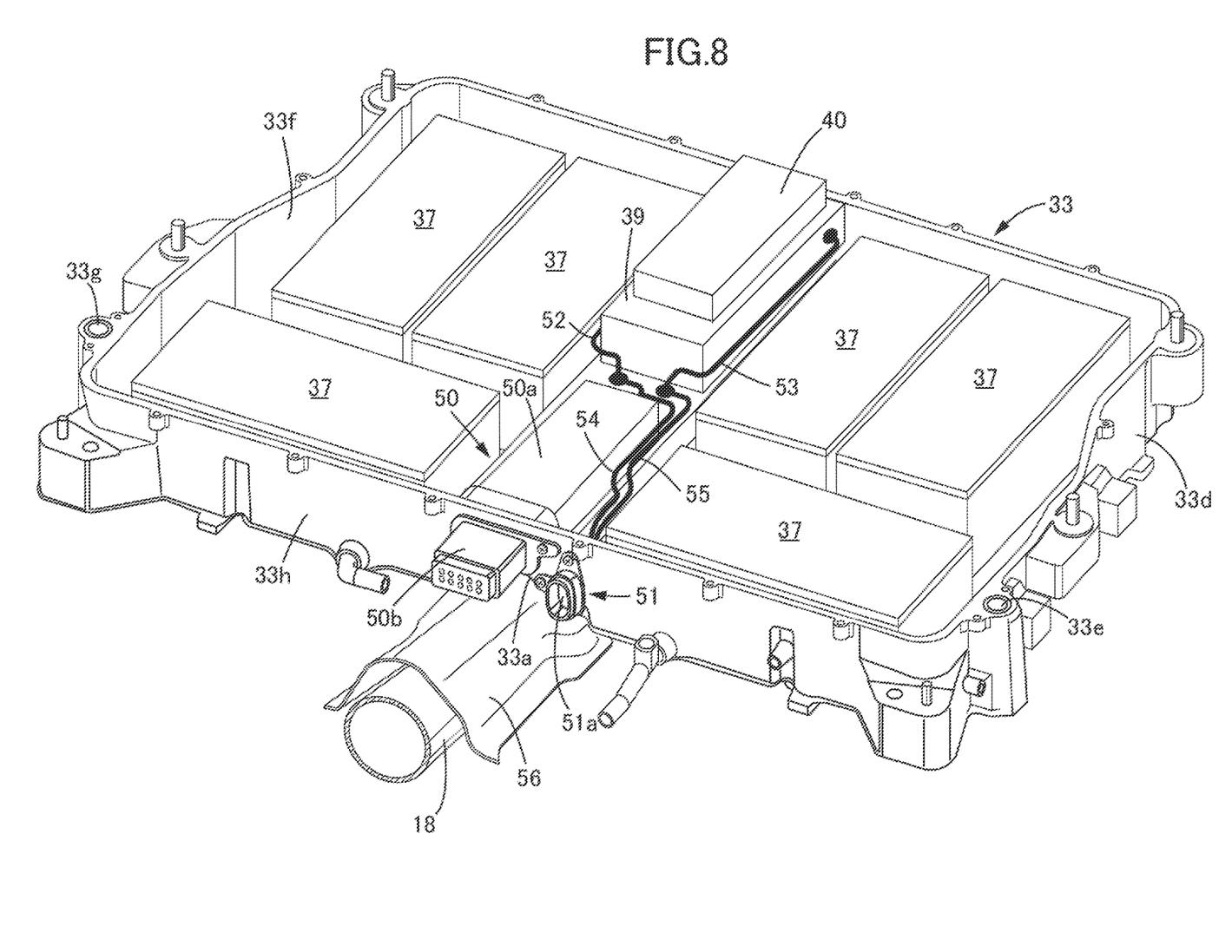
FIG. 8 is a perspective view in a state in which a first cover of a first battery case is detached. (second embodiment)

A second embodiment of the present invention is now explained by reference to FIG. 8.

Second Embodiment

In the first embodiment, the four battery modules 37 are disposed in the interior of the first case main body 33 so that their longitudinal direction is oriented in the fore-and-aft direction, but in the second embodiment two battery modules 37 are disposed on the front side in the interior of the first case main body 33 so that their longitudinal direction is oriented in the vehicle width direction and, furthermore, four battery modules 37 are disposed on the rear side in the interior of the first case main body 33 so that their longitudinal direction is oriented in the fore-and-aft direction. These six battery modules 37 are disposed in a divided manner with three on each of opposite sides in the vehicle width direction of the recess portion 33*a* formed along the fore-and-aft direction in a middle part in the vehicle width direction of the first case main body 33, and the junction board 39, the battery control device 40, a low voltage connector 50 and a high voltage connector 51 are disposed by utilizing a space above the recess portion 33*a* in which no battery module 37 is disposed.

That is, the junction board 39 on the lower side and the battery control device 40 on the upper side are disposed on the rear side above the recess portion 33*a* as two layers in the vertical direction. Furthermore, a main body portion 50*a* of the low voltage connector 50 is disposed on the front side above the recess portion 33*a*, and an interface portion 50*b* of the low voltage connector 50 is mounted on a front wall 33*h* above the recess portion 33*a* of the first case main body 33. Furthermore, the high voltage connector 51 is formed from an interface portion 51*a*, and the interface portion 51*a* is also mounted on the left side of the interface portion 50*b* of the low voltage connector 50 on the front wall 33*h* above the recess portion 33*a* of the first case main body 33.

The junction board 39, the main body portion 50*a* of the low voltage connector 50, and the high voltage connector 51 are connected via bus bars 52 to 55, the interface portion 50*b* of the low voltage connector 50 supplies low voltage current to auxiliary equipment, and the interface portion 51*a* of the high voltage connector 51 supplies high voltage current to the electric motor 11.

A heat insulating plate 56 having a shape that follows the recess portion 33*a* of the first case main body 33 extends forward from the front wall 33*h*, and due to the heat insulating plate 56 being present between the exhaust pipe 18 disposed beneath the recess portion 33*a* and the interface portion 50*b* of the low voltage connector 50 and the interface portion 51*a* of the high voltage connector 51 they are protected from the heat of the exhaust pipe 18.

As described above, in accordance with the second embodiment, in addition to the operational effects of the first embodiment, since the interface portions 50*b*, 51*a* of the low voltage connector 50 and the high voltage connector 51 are disposed on the front wall 33*h* of the first battery case 31 above the recess portion 33*a* of the first case main body 33, it is possible to efficiently carry out the routing of wiring for electrical equipment disposed in front of the first battery case 31. Moreover, since the main body portion 50*a* of the low voltage connector 50 is disposed above the recess portion 33a, it is possible to rationally dispose the main body portion 50a of the low voltage connector 50 by utilizing effectively a dead space above the recess portion 33a where no battery module 37 is disposed. Furthermore, since the interface portions 50b, 51a of the low voltage connector 50 and the high voltage connector 51 are disposed on the front wall 33h of the first battery case 31, the main body portion 50a of the low voltage connector 50 is disposed in front of the junction board 39 disposed above the recess portion 33a, and the junction board 39 and the main body portion 50a are electrically connected to each other, it is possible to minimize the length of the bus bars 52, 53 providing a connection between the junction board 39 and the main body portion 50a of the low voltage connector 50.

Embodiments of the present invention are explained above, but the present invention may be modified in a variety of ways as long as the modifications do not depart from the subject matter.

For example, the exhaust passage member of the present invention is not limited to the muffler 19 of the embodiments but may be the exhaust pipe 18 on the upstream side or the downstream side of the muffler 19.

Furthermore, in the embodiments both the first case main body 33 of the first battery case 31 and the second cover 43 of the second battery case 32 include the beam portions 34f, 43d, but they may include at least one of the beam portions 34f, 43d.

Moreover, in the embodiments both the battery control device 40 and the junction board 39 are disposed in the space above the recess portion 33a in the rear part of the first battery case 31, but at least one of the battery control device 40 and the junction board 39 may be disposed there.

Furthermore, in the embodiment the interface portions 50b, 51a of the low voltage connector 50 and the high voltage connector 51 are provided on the front wall 33h of the first case main body 33, but they may be provided on the rear wall of the first case main body 33.

Moreover, the cooling medium of the present invention is not limited to the cooling water of the embodiments.

The invention claimed is:

1. An electric vehicle comprising an electric motor, an engine, a battery case disposed on a lower face of a floor panel and housing battery modules for driving the electric motor, an exhaust passage member extending rearward from the engine, and a front seat and a rear seat disposed on an upper face of the floor panel,
wherein the battery case comprises a first battery case and a second battery case that are formed independently so as to each house a separate battery module, the second battery case has a smaller size than a size of the first battery case and is disposed on an upper front part of the first battery case, the second battery case is disposed below a front part of a seat cushion of the rear seat, a cooling medium jacket cooling the second battery case from an outside of the second battery case is formed between a case upper wall of the first battery case and a case lower wall of the second battery case, a recess portion extending in a fore-and-aft direction and having at least part of the exhaust passage member passing therethrough is formed in a lower face of a middle part in a vehicle width direction of the first battery case, the battery modules housed in the first battery case are disposed on left and right sides of the recess portion, and the battery module housed in the second battery case is disposed so that a longitudinal direction thereof follows the vehicle width direction.

2. The electric vehicle according to claim 1, wherein at least one of a battery control device and a junction board is disposed in a space above the recess portion in a rear part of the first battery case, and a cell voltage sensor is disposed in a space above the battery module in the rear part of the first battery case.

3. The electric vehicle according to claim 2, wherein a height of a middle part in the vehicle width direction of a rear upper face of the first battery case is smaller than a height of an upper face of the second battery case.

4. The electric vehicle according to claim 1, wherein the cooling medium jacket is defined by a lower face of the case upper wall of the first battery case and an upper face of the case lower wall of the second battery case.

5. The electric vehicle according to claim 1, wherein a case rear wall of the second battery case is inclined from upper front toward lower rear, and wiring is disposed in a space defined between a front face of the case rear wall and a rear face of the battery module disposed in a front part of the second battery case.

6. The electric vehicle according to claim 1, wherein at least one of an upper part of the first battery case and a rear part of the second battery case comprises a beam portion extending in the vehicle width direction.

7. The electric vehicle according to claim 1, wherein the first battery case comprises a connector providing electrical connection between the battery modules and electrical equipment of the electric vehicle, the connector comprises a main body portion and an interface portion, and the interface portion is disposed on a front wall or a rear wall of the first battery case above the recess portion when viewed in the vehicle body fore-and-aft direction.

8. The electric vehicle according to claim 7, wherein the main body portion is disposed above the recess portion when viewed from above.

9. The electric vehicle according to claim 8, wherein the interface portion is disposed on the front wall of the first battery case, the main body portion is disposed in front of a junction board disposed above the recess portion, and the junction board and the main body portion are electrically connected to each other.

* * * * *